United States Patent [19]

Frimmel, Jr. et al.

[11] Patent Number: 4,829,514
[45] Date of Patent: May 9, 1989

[54] DIGITAL VOICE RECORDING AND REPRODUCTION AND TELEPHONE NETWORK SIGNALLING USING DIRECT STORAGE IN RAM OF PCM ENCODED DATA

[75] Inventors: James J. Frimmel, Jr., San Diego, Calif.; Thomas Ouellette, Fairfax; Richard N. Deglin, Reston, both of Va.; Lester A. Potter, Riverdale, Md.

[73] Assignee: International Telesystems Corporation, Herndon, Va.

[21] Appl. No.: 27,239

[22] Filed: Mar. 18, 1987

[51] Int. Cl.[4] .......................................... H04Q 11/04
[52] U.S. Cl. ...................................... 370/58; 370/61; 379/89
[58] Field of Search ...................... 370/58, 60, 94, 61, 370/67, 104, 59, 64; 379/83, 84, 89

[56] References Cited

U.S. PATENT DOCUMENTS

| | | | |
|---|---|---|---|
| 4,058,672 | 11/1977 | Crager et al. | 370/94 |
| 4,221,933 | 9/1980 | Cornell et al. | 379/84 |
| 4,357,493 | 11/1982 | Anderson et al. | 379/84 |
| 4,442,502 | 4/1984 | Friend et al. | 370/58 |
| 4,564,936 | 1/1986 | Takahashi | 370/58 |
| 4,602,129 | 7/1986 | Matthews et al. | 379/84 |
| 4,608,460 | 8/1986 | Carter et al. | 379/84 |
| 4,623,761 | 11/1986 | Winter et al. | 379/84 |
| 4,663,777 | 5/1987 | Szeto | 379/84 |

OTHER PUBLICATIONS

"Digital Voice Store-Forward System Answers Phones, Takes Messages", Electronics, Apr. 21, 1983.

Primary Examiner—M. H. Paschall
Attorney, Agent, or Firm—James Creighton Wray

[57] ABSTRACT

A digital voice recording and reproducing device, preferably connected to a telephone network uses a storage RAM to store voice messages and digital signals. An internal processor connected to the storage RAM processes digital signals to and from the storage RAM. A high speed RAM connected to the internal processor receives and transmits digital signals to and from the internal processor. Encoders and decoders encode voice signals into pulse code modulated (PCM) signals to be delivered into the high speed RAM, and decode digital PCM signals from the high speed RAM. A high speed processor (HSP) connected to the high speed RAM delivers signals from a switch to the high speed RAM. An internal processor connected to the switch, high speed RAM (HSP) and the storage RAM controls the input of signals to the high speed processor, to the high speed RAM and to the storage RAM, and controls the output of signals from the storage RAM to the internal processor and the high speed RAM, and then via the switch and the decoders to output means such as telephone lines.

30 Claims, 3 Drawing Sheets

DIGITAL VOICE RECORDING AND REPRODUCTION AND TELEPHONE NETWORK SIGNALLING USING DIRECT STORAGE IN RAM OF PCM ENCODED DATA

BACKGROUND OF THE INVENTION

The present invention relates to systems to record and reproduce voice, especially as part of call management systems which connect to telephone networks and generate telephone network signalling. This invention is of particular use in, although not limited to, call management systems which originate telephone calls.

Call management systems, also known as call origination systems or telemarketing systems or tele-collections systems, sequentaily select telephone numbers, capture a telephone line, generate DTMF or pulse signals, supply the signals to the line and listen for call progress tones, such as a busy signal or ringing, as well as presence of human voice. Upon an indication that a telephone has been answered, the system transfers the call to a station operator or plays a selected stored message over the telephone line to the called party. The system may also have the capability to play a selected stored message to the called party after connection to the station operator, at the operator's direction, and/or to connect the party to a station operator after playing a selected message.

Systems currently in use utilize tone or pulse generators, and voice recording and reproduction means, physically and logically separate from the processor which controls the system. A need exists to improve speed and quality of telephone network signalling and voice recording and reproduction, and the length and number of recorded messages.

SUMMARY OF THE INVENTION

A call management system has a digital voice recording and reproducing means and a telephone network signalling apparatus. A storage RAM stores digital signals. An internal processor connected to the storage RAM processes digital signals to and from the storage RAM. A high speed RAM connected to the internal processor receives and transmits digital signals from and to the internal processor. Encoders and decoders encode voice signals into pulse code modulated (PCM) signals to be delivered into the high speed RAM, and decode digital PCM signals from the high speed RAM. A high speed processor (HSP) connected to the high speed RAM delivers signals from a switch to the high speed RAM. An internal processor connected to the switch, high speed RAM (HSP) and the storage RAM controls the input of signals to the high speed processor, to the high speed RAM and to the storage RAM, and controls the ouput of signals from the storage RAM to the internal processor and the high speed RAM, and thence via the switch and the decoders to output means such as telephone lines.

This invention provides an improved means for digital voice recording and reproduction. Methods currently in use rely on magnetic media storage, which is slow and results in some degradation in quality of reproduced voice. Other methods currently in use rely on delta-modulation encoding of the voice signal, which also results in some degradation in quality of reproduced voice. This invention uses pulsed coded modulation (PCM) encoding and stores the PCM-encoded digital data in a buffer random-access memory (RAM), and then in a storage RAM, providing higher speed and higher quality than methods currently in use. This method also provides the ability to record and play back multiple messages, in numbers and length limited only by the amount of RAM available. This method also makes it possible to play back multiple renditions of a recorded voice segment simultaneously, each rendition starting at the beginning of the segment when cued by the controlling processor, with no degradation of message quality and with no delays in playing any rendition.

This invention provides the direct storage of PCM-encoded digitized voice to, and retrieval from, high-speed random access memory (RAM) via a digital switching means controlled by an internal processor such as a Motorola 68000.

The invention also provides the transfer of PCM-encoded digitized voice to and from a dynamic storage random access memory (RAM) by an internal processor.

The invention also provides the storage of digital signals representing voice through a high speed processor (HSP) to a high speed RAM.

This invention provides the combination of storage to and retrieval from a high speed RAM by a signal processor or digital switching means with the transfer to and from a large dynamic RAM and the high speed RAM.

One object of the invention is the rapid encoding, storage, retrieval and decoding of voice to and from the high speed RAM using a T1 interface means, which in turn connects to input(s), telephone line(s), telephone central offices, PBX's and channel banks, operator headsets, and/or other voice transmission means.

Another object of the invention is the combination of the encoding, storage, retrieval and decoding of voice to and from high speed RAM with the transfer of PCM-encoded digitized voice to and from a dynamic random access memory.

The invention provides a combination of the storage methods noted above with pulse coded modulation (PCM) encoding and decoding by coder-decoder (CODEC) chips, which in turn are connected to input sources, telephone lines, operator headsets and/or other voice transmission means as part of an automated telephone answering or call originating system.

The invention also provides the combination of the buffer storage in a high speed RAM via a high speed processor, as above, with the T1 interface means and encoding, decoding, and switching with the input sources, telephone lines, telephone company central offices, PBX's and channel banks, operator headsets, and/or other voice transmission means. The coding and decoding are performed by the switching means without separate CODEC processors, as part of an automated telephone answering or call originating system.

The invention provides the use of recorded and/or synthesized DTMF tones, dialing pulses, and E&M signals, or the digitized representation thereof, stored in random access memory and accessed by an internal processor, a high speed random access memory, and a digital switching means, to generate telephone signaling and dialing as part of an automated call origination system.

The invention also provides the combination of tone, pulse and/or signal generation with voice recording, reproduction and transmission means, as part of an automated call origination system.

The invention also provides detection of E and M signalling from T1 input, and recognition of call progress tones.

The combination of tone, pulse and/or signal generation with voice recording, reproduction and transmission means, as part of an automated call origination system, is an object of this invention.

A preferred digital voice recording and telephone network signalling system comprises a storage RAM, a high speed processor connected to the storage RAM, a high speed RAM connected to the high speed processor and switching means, encoding and decoding means connected to each other and connected to the high speed processor and to the high speed RAM for communicating signals with the high speed processor and the high speed RAM, and input and output means connected to the switching means and to the encoding and decoding means for communicating voice frequency signals with the encoding and decoding means.

The digital voice recording and telephone network signalling system further includes an internal processor connected to the high speed RAM and a storage RAM connected to the internal processor for communicating digital signals.

Control means are preferably connected to the internal processor and to the high speed RAM and the high speed processor (HSP) for controlling the high speed RAM and the HSP with the internal processor.

The preferred encoding and decoding means comprises coder/decoder (CODEC) chips connected to the input and output means for communicating voice frequency signals with the input and output means and connected to the switching means for providing pulse code modulated (PCM) digital signals to the switching means.

Preferably, the switching means further comprises a digital switching means connected to the CODEC chips for communicating digital signals therewith.

A preferred system further comprises means, such as a shift register or a serial-to-parallel converter, to convert switched digital signals to parallel processor-readable PCM, connected to digital switching means and to the high speed processor (HSP) for communicating digital signals from the switching means to the HSP.

Preferably, the digital voice recording and telephone network signalling system further comprises a means such as, a shift register or a parallel-to-serial converter, to convert parallel processor-readable PCM to digital signals, connected to the high speed RAM and to the digital switching means (DSM) for communicating digital signals from the high speed RAM to the DSM.

A preferred system further comprises an internal processor and a backplane bus having first connections to the DSM, to the high speed RAM, and to the HSP and having second connections to the internal processor for controlling the DSM, the high speed RAM, the HSP and the storage RAM by the internal processor.

Preferably, the internal processor comprises a single board microcomputer which is connected to the backplane bus.

Preferably, the system includes an internal processor and a backplane bus having proximal connections to the internal processor and having distal connections to the storage RAM, the HSP, and high speed RAM, and the switching means.

The preferred system further comprises an application processor connected to the internal processor for controlling the internal processor.

The preferred encoding and decoding means comprises coder/decoder means connected to headsets and to a message imput means and connected to the switching means.

The switching means preferably comprises a digital cross point.

In another preferred embodiment, the switching means comprises a T1 interface means connected to the input and output devices.

The preferred system further comprises an internal processor and a backplane bus having proximal connections to the internal processor and having distal connections to the T1 interface means, the high speed RAM, and the HSP.

The digital voice recording and telephone network signalling system preferably comprises control means connected to the internal processor for controlling the internal processor.

A preferred control means is a terminal.

In an alternate embodiment, the control means is a computer.

One preferred digital voice recording and production and telephone network signalling system comprises the steps of retrieving digital signals from a storage RAM, processing the digital signals and delivering the processed signals into a high speed RAM, delivering digital signals from the high speed RAM, and switching and decoding the digital signals into voice frequency signals over one of plural telephone lines.

Preferably, the system further comprises providing a voice signal to coding means and digitally encoding the voice signals into digital signals, providing the digital signals to the high speed RAM, providing digital signals from the high speed RAM to an internal processor, and providing digital signals from the internal processor to the storage RAM.

Preferably, providing digital signals to the high speed RAM comprises providing digital signals to a high speed processor and providing digital signals from the processor to the high speed RAM.

Providing digital signals from the high speed RAM preferably comprises providing parallel digital signals to a prallel-to-serial converter, providing serial signals to a digital switching means (DSM), and providing digital signals from the DSM to a selected one of plural coder/decoder (CODEC) chips.

A preferred system further comprises providing input voice signals to a CODEC chip, providing digital signals from the CODEC chip to the digital switching means (DSM), providing serial digitial signals from the DSM to serial-to-parallel converter and providing parallel digital signals from the converter to the high speed RAM.

Preferably, providing digital signals to the high speed RAM comprises providing digital signals to a high speed processor, such as a digital signal processor, and providing digital signals from the processor to the high speed RAM.

A preferred system further comprises controlling the digital switching means, the high speed RAM and the high speed processor with an internal processor, and controlling the internal processor with an application processor.

Preferably, the switching and encoding steps comprise encoding voice signals into digital signals, communicating digital signals into the high speed RAM, and switching digital signals to and from the high speed RAM; and the decoding steps comprise decoding digital signals from the high speed RAM into voice signals and providing the voice signals to output means.

One embodiment of a call management system having a digital voice recording and reproducing means and telephone network signalling apparatus comprises a storage RAM for storing digital signals, an internal processor connected to the storage RAM for processing digital signals to and from the storage RAM, and a high speed RAM connected to the internal processor for receiving and transmitting digital signals to and from the internal processor. Encoding and decoding and switching means are connected to each other by encoding, decoding and switching signals. These means are also connected to the high speed RAM for encoding voice signals into pulse code modulated (PCM) signals to be delivered into the high speed RAM, and for decoding digital PCM signals from the high speed RAM. The system also includes a high speed processor connected to the high speed RAM delivering signals from the switching means to the high speed RAM, the high speed processor and the storage RAM; for controlling the inputting of signals to the high speed processor, to the high speed RAM and to the storage RAM; and for controlling the outputting of signals from the storage RAM to the internal processor and the high speed RAM, and thence via the switching means and the decoding means to output means such as telephone lines.

The preferred system further comprises controlling means and sensing means connected to the internal processor and to the switching means, the high speed processor, and the high speed RAM, and connected to the high speed processor and the high speed RAM for controlling and sensing the condition of the high speed RAM, the switching means and the high speed processor.

DETAILED DESCRIPTION OF THE DRAWINGS

Throughout the drawings, data lines are shown as heavy black lines. Control (C) and Status (S) lines are shown in light lines, and voice lines are shown as broken lines.

Figure 1:
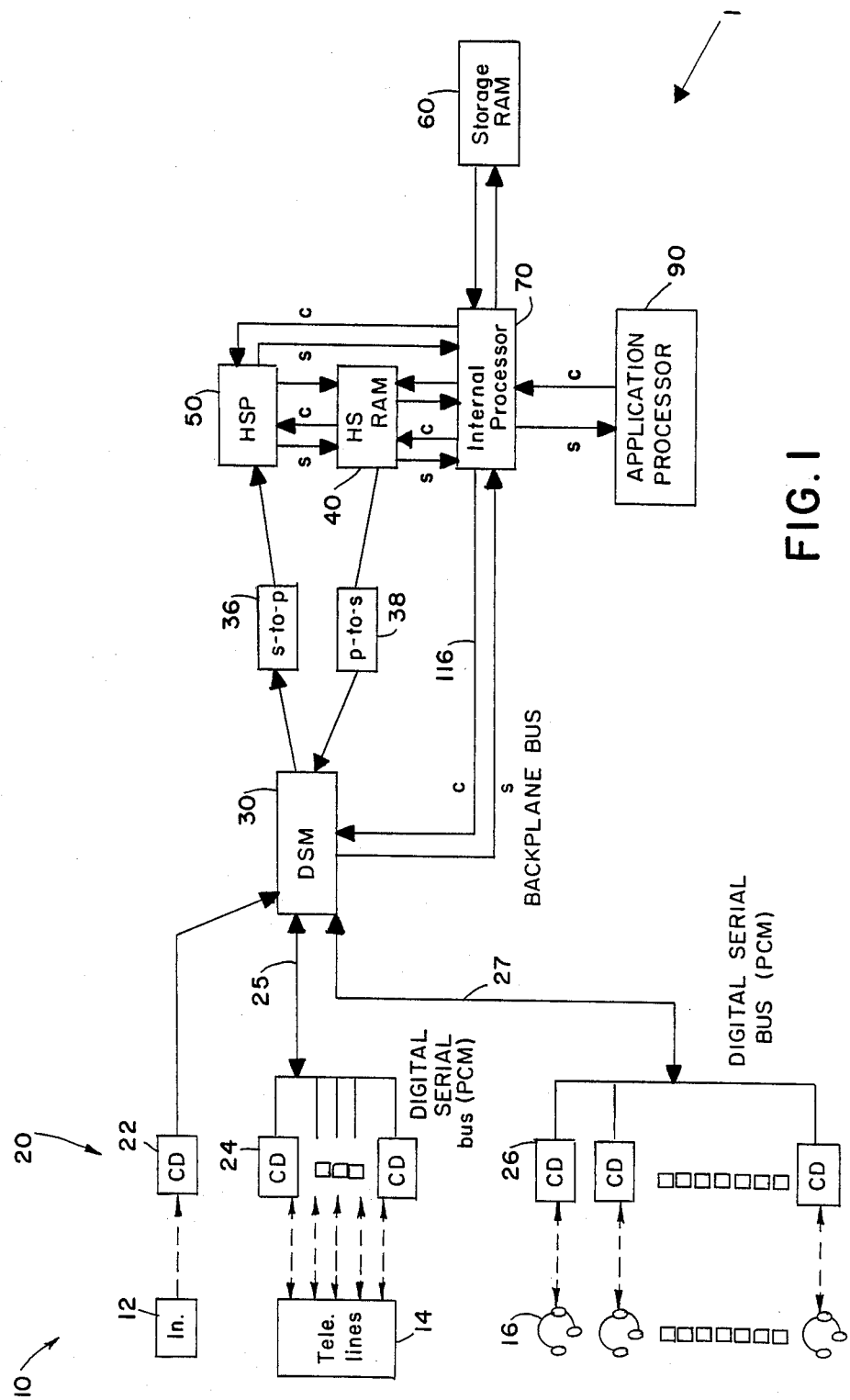

One preferred embodiment of the system 1 is shown in FIG. 1. This invention utilizes a digital switching means 30, connected to a plurality of coder/decoder (CODEC) chips 20. Each CODEC is connected to an input or output device 10, such as CODEC 22 connected to an input source 12 (a microphone or a tape recorder/player, for example), CODEC's 24 are severally connected to telephone lines 14 via a telephone line interface, and CODEC's 24 are connected via a time division multiplexing line 25 to digital switching means (DSM) 30. Each CODEC 26 is connected to one of plural operator's headsets 16, and CODEC's 26 are connected via time division multiplexing line 27 to DSM 30. The DSM 30 is controlled via a backplane bus 116, such as the IEEE-796 standard bus (Multibus), by a microcomputer processor 70, such as Motorola 68000 single board computer. Processor 70 also operates a high-speed random access memory (RAM) 40, a high speed processor (HSP) 50 such as a digital signal processor, and a large storage RAM array 60 on the backplane bus. The DSM 30 accesses the high-speed RAM 40 via shift register 36 and 38, which perform serial-to-parallel and parallel-to-serial conversion, respectively. The HSP 50 accesses the high-speed RAM 40 via direct memory addressing. The HSP 50 executes code from the high-speed RAM 40, as directed by the internal processor 70, which loads instructions for the HSP directly into the high-speed RAM 40. The internal processor 70 in turn can be directed and controlled by a terminal or external processor 90. The DSM 30 is addressed as an input/output (I/O) port on the backplane bus 116.

Incoming voice signals 10 from input 12 (a microphone or tape recorder) and from telephone lines 14 are PCM encoded by the CODEC chips 22, 24 and passed through the DSM 30 and the HSP 50 to the high-speed RAM 60. The HSP 50, the high speed RAM 40 and internal processor 70 in concert transmit the resulting encoded data to the storage RAM 60 via the backplane bus I/O path 116.

When a recording is to be played back, the microprocessor 70 causes the appropriate digitized data to be transferred from the storage RAM 60 via the HSP 50 into the high-speed RAM 40 and causes the DSM 30 to send the data to the appropriate CODEC chip 24 or 26. The selected CODEC chip 24 or 26 converts the data back to analog form and plays it back through the corresponding headset 16 or telephone lines interface 14.

Dual-tone multi-frequency (DTMF) tones, dialing pulses, and E and M telephone signals are similarly encoded in the high-speed RAM 40 and are played back over a DSM-CODEC path to a telephone line 14, providing a means for automated, processor-directed dialing as part of an automatic call origination system 1.

Figure 2:
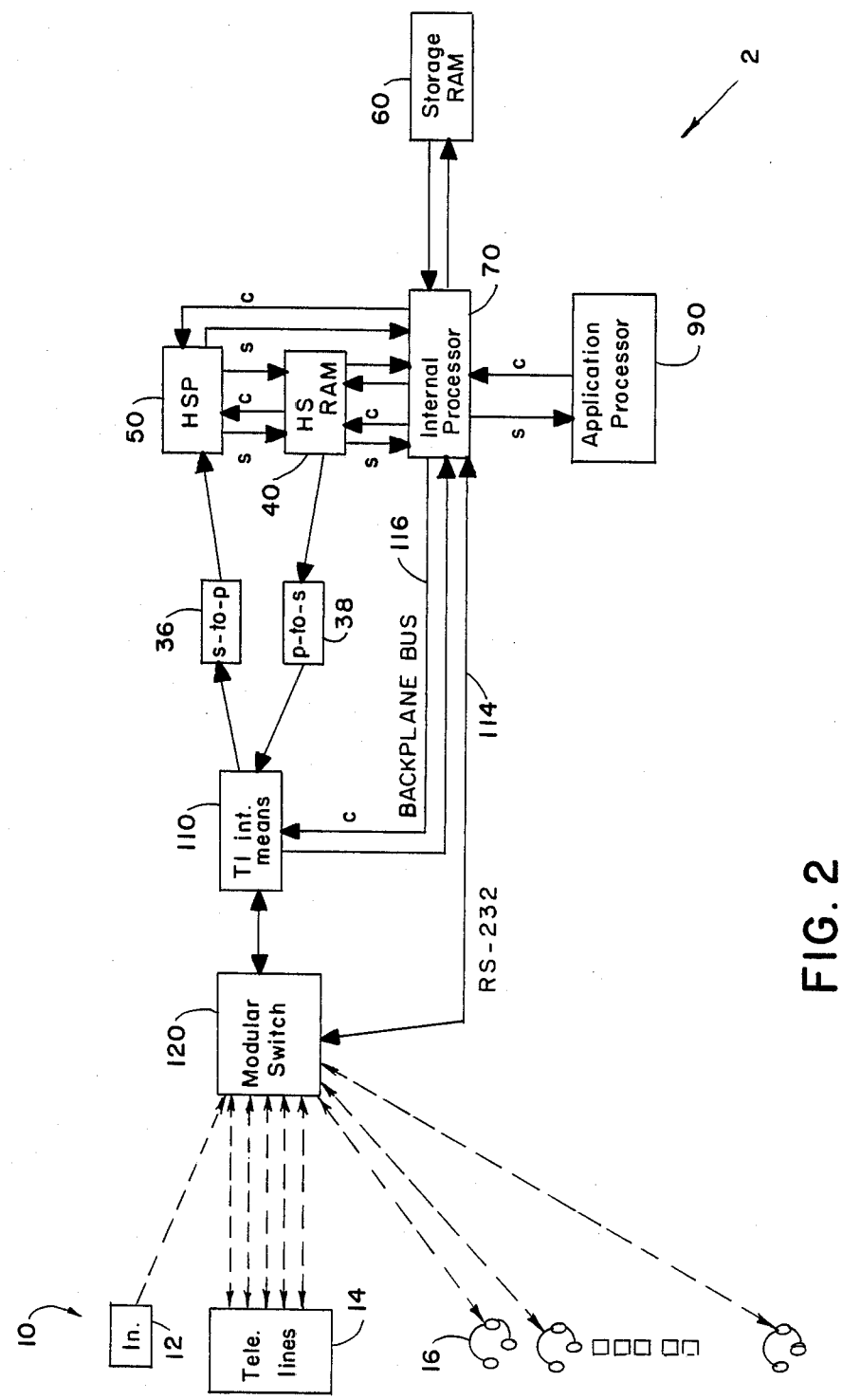

In another preferred realization, shown in FIG. 2, the high-speed RAM 40 is accessed directly by a T1 interface means 110, controlled by the microprocessor 70 via the backplane bus path 116. The T1 interface means 110 in turn connects via a direct T1 interface 112 to a switch 120 which is connected to a plurality of input and output means 10, such as telephone lines 14, operator headsets 16, and/or voice input means 12 such as a microphone. The switch 120, as directed by the processor 70 via control and status connection 114 (which is a standard RS-232 interface, in a preferred embodiment), selects input and output means for the receipt and transmission of voice signals and telephone network signalling.

Figure 3:
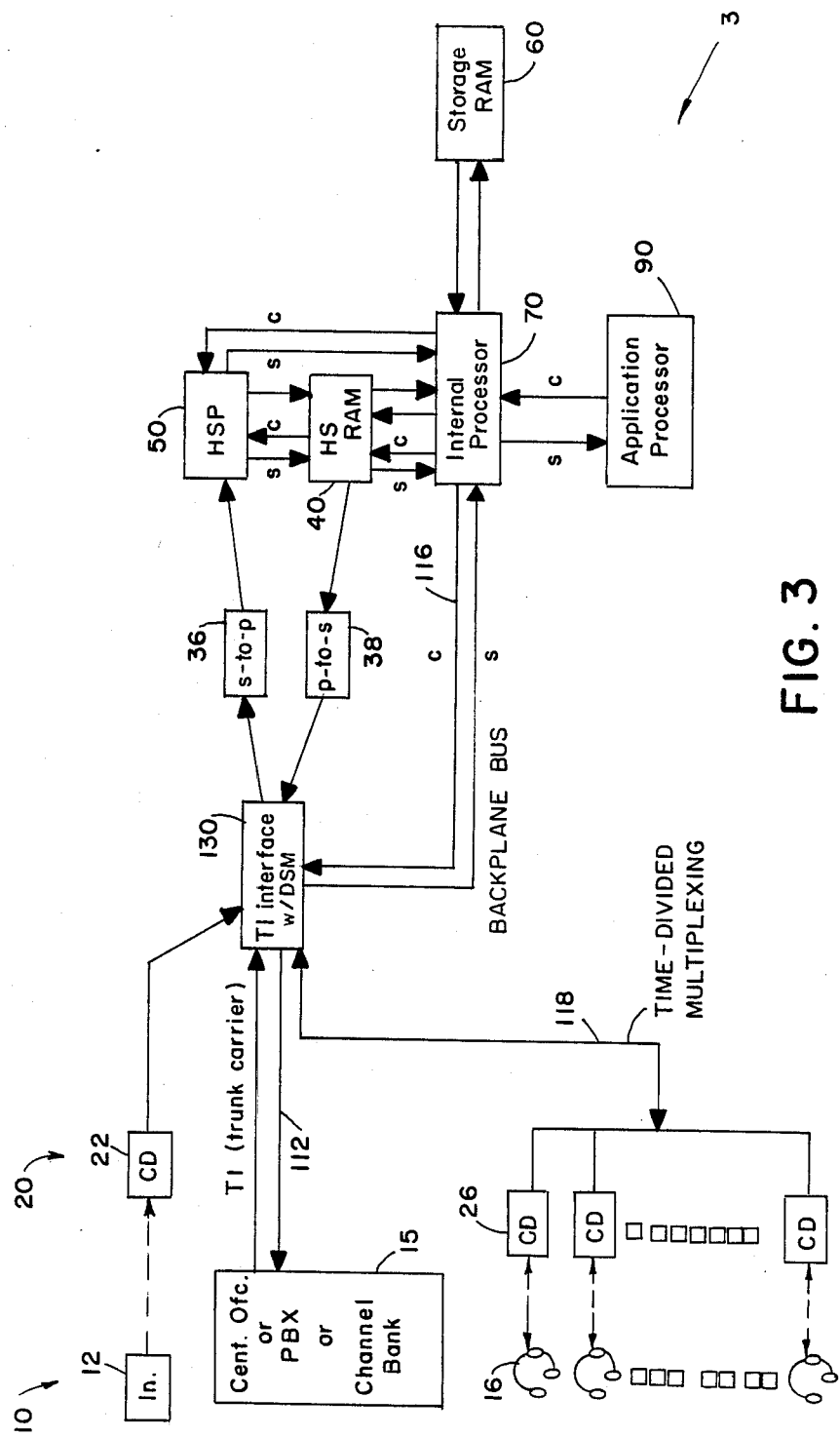

The embodiment 3, shown in FIG. 3, is similar to system 2 with the exception that T1 data lines 112 directly connect the T1 interface means 130, which include digital switching means, to a central office, PBX or channel bank 15, and the T1 interface means 130 is connected to operator headsets 16 by time-divided multiplexing data line 18.

While the invention has been described with reference to specific embodiments, modifications and variations may be constructed without departing from the scope of the following claims.

We claim:
1. A digital voice recording and telephone network signalling system comprising a high speed processor (HSP), a high speed RAM connected to the HSP, an internal processor connected to the high speed RAM, a storage RAM connected to the internal processor for communicating digital signals, switching means, and encoding and decoding means connected to each other and connected to the HSP and to the high speed RAM for communicating signals with the HSP and the high speed RAM, and input and output means connected to the switching means and to the encoding and decoding means for communicating voice frequency signals with the encoding and decoding means.

2. The apparatus of claim 1 further comprising control means connected to the internal processor and to the high speed RAM and the HSP for controlling the high speed RAM and the HSP with the internal processor.

3. The apparatus of claim 1 wherein the encoding and decoding means comprises coder/decoder (CODEC) chips connected to the input and output means for communicating voice frequency signals with the input and output means and connected to the switching means for providing pulse code modulated (PCM) digital signals to the switching means.

4. The system of claim 3 wherein the switching means further comprises a digital switching means connected to the CODEC chips for communicating digital signals therewith.

5. The system of claim 4 further comprising means, such as a serial-to-parallel converter, connected to digital switching means and to the high speed processor (HSP) for communicating digital signals from the switching means to the HSP.

6. The system of claim 4 further comprising means, such as a parallel-to-serial converter, connected to the high speed RAM and to the digital switching means (DSM) for communicating digital signals from the high speed RAM to the DSM.

7. The system of claim 4 further comprising an internal processor and a backplane bus having first connections to the DSM, to the high speed RAM, and to the HSP and having second connections to the internal processor for controlling the DSM, the high speed RAM, and HSP and the storage RAM by the internal processor.

8. The system of claim 7 wherein the internal processor comprises a single board microcomputer which is connected to the backplane bus.

9. The system of claim 1 further comprising a backplane bus having proximal connections to the internal processor and having distal connections to the storage RAM, the HSP, and high speed RAM, and the switching means.

10. The system of claim 9 further comprising an application processor connected to the internal processor for controlling the internal processor.

11. The system of claim 1 wherein the encoding and decoding means comprises coder/decoder means connected to headsets and to a message input means and to telephone lines and connected to the switching means.

12. The system of claim 1 wherein the switching means comprises a digital cross point.

13. The system of claim 1 wherein the switching means comprises a T1 interface means connected to a modular switch which, in turn, is connected to the input and output devices.

14. The system of claim 13 further comprising an internal processor and a backplane bus having proximal connections to the internal processor and having distal connections to the T1 interface means, the high speed RAM, and the HSP; and a control and status connection between the internal processor and the modular switch.

15. The system of claim 1 wherein the switching means comprises a T1 interface means containing the digital switching means and connected to the input and output devices 1.

16. The system of claim 15 further comprising an internal processor and a backplane bus having proximal connections to the internal processor and having distal connections to the T1 interface means, the high speed RAM, and the HSP.

17. The system of claim 1 further comprising a backplane bus having proximal connections to the internal processor and having distal connections to the digital switching means, the high speed RAM, and the HSP.

18. The system of claim 17 comprising control means connected to the internal processor for controlling the internal processor.

19. The system of claim 18 wherein the control means is a terminal.

20. The system of claim 18 wherein the control means is a computer.

21. A digital voice recording and production and telephone network signalling method comprising the steps of retrieving digital signals from a storage RAM, processing the digital signals and delivering the processed signals into a high speed RAM, delivering digital signals from the high speed RAM, and switching and decoding the digital signals into voice frequency signals over one of plural telephone lines.

22. The method of claim 21 further comprising providing a voice signal to coding means and digitally encoding the voice signals into digital signals, providing the digital signals to the high speed RAM, providing digital signals from the high speed RAM to an internal processor, and providing digital signals from the internal processor to the storage RAM.

23. The method of claim 22 wherein providing digital signals to th high speed RAM comprises providing digital signals to a high speed processor and providing digital signals from the processor to the high speed RAM.

24. The method of claim 21 wherein providing digital signals from the high speed RAM comprises providing parallel digital signals to a parallel-to-serial converter, providing serial signals to a digital switching means (DSM), and providing digital signals from the DSM to a selected one of plural coder/decoder (CODEC) chips.

25. The method of claim 24 further comprising providing input voice signals to a CODEC chip, providing digital signals from the CODEC chip to the digital switching means (DSM), providing serial digital signals from the DSM to a serial-to-parallel converter, and providing parallel digital signals from the converter to the high speed RAM.

26. The method of claim 25 wherein providing digital signals to the high speed RAM comprises providing digital signals to a high speed processor, such as a digital signal processor, and providing digital signals from the processor to the high speed RAM.

27. The method of claim 24 further comprising controlling the digital switching means, the high speed RAM and the high speed processor with an internal processor, and controlling the internal processor with an application processor.

28. The method of claim 21 wherein the switching and encoding steps comprise encoding voice signals into digital signals, communicating digital signals into the high speed RAM, and switching digital signals to and from the high speed RAM; and the decoding steps comprise decoding digital signals from the high speed RAM into voice signals and providing the voice signals to output means.

29. A call management system having a digital voice recording and reproducing means and telephone network signalling apparatus comprising: a storage RAM for storing digital signals, and internal processor connected to the storage RAM for processing digital signals to and from the storage RAM; a high speed RAM connected to the internal processor for receiving and transmitting digital signals to and from the internal processor; encoding and decoding and switching means connected to each other for encoding, decoding and switching signals and connected to the high speed RAM for encoding voice signals into pulse code modulated (PCM) signals to be delivered into the high speed RAM, and for decoding digital PCM signals from the high speed RAM; and a high speed processor (HSP) connected to the high speed RAM for delivering signals from the switching means to the high speed RAM, the HSP and the storage RAM, for controlling the inputting of signals to the high speed processor, to the high speed RAM and to the storage RAM, and for controlling the outputting of signals from the storage RAM to the internal processor and the high speed RAM, and thence via the switching means and the decoding means to output means such as telephone lines.

30. The system of claim 29 further comprising controlling means and sensing means connected to the internal processor and to the switching means, the high speed processor (HSP), and the high speed RAM, and connected to the HSP and the high speed RAM for controlling and sensing the condition of the high speed RAM, the switching means and the HSP.

* * * * *